J. Cassiday
Sled Brake
No. 74989   Patented March. 3. 1868
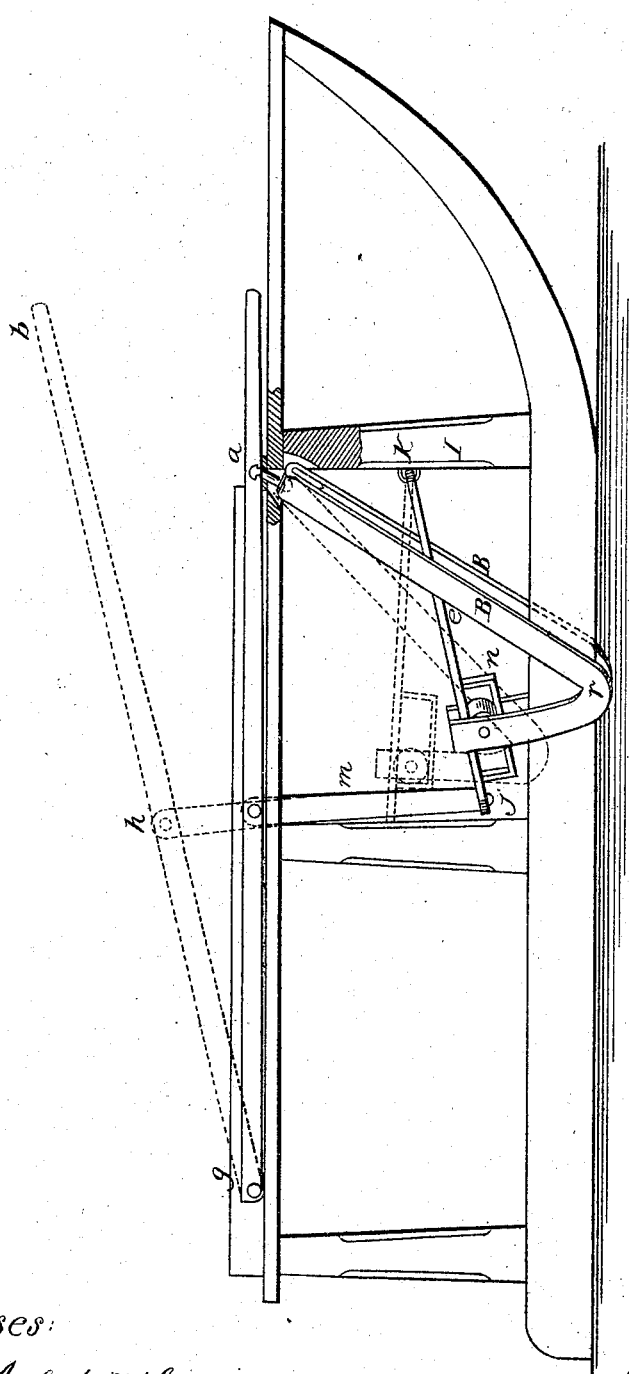
Witnesses:
W. C. Aslikettle
Theo Tusche
Inventor:
J. Cassidy,
per Munn &
attorneys

United States Patent Office.

JOHN CASSIDY, OF MONTEZUMA, IOWA.

Letters Patent No. 74,989, dated March 3, 1868.

---

IMPROVEMENT IN SLED-BRAKES.

---

*The Schedule referred to in these Letters Patent and making part of the same.*

---

TO ALL WHOM IT MAY CONCERN:

Be it known that I, JOHN CASSIDY, of Montezuma, in the county of Poweshiek, and State of Iowa, have invented new and useful Improvements in Sled-Locks or Brakes; and I do hereby declare that the following is a full, clear, and exact description thereof, which will enable those skilled in the art to make and use the same, reference being had to the accompanying drawing, forming part of this specification.

The drawing represents a side elevation of a sled having my improvements attached.

This invention refers to the locking of sleds or sleighs when descending hills or declivities. It consists of two angular-locking-irons, which are raised or lowered by a lever, as will hereinafter be more fully set forth.

In the drawing is shown a common sled, having pivoted thereto, at $a$, a pair of locking-irons, B; a compound lever device, consisting of the lifting-bar $e$, connected at one end by a link, $m$, to the lever $b$, the other end of the said lifting-bar being pivoted to an upright, I, of the sled-frame, as shown. A rectangular or other frame, as shown at $n$, forms part of the lifting-bar $e$, and is for the purpose of enclosing the roller $i$, which connects the ends of the locking-irons. The points $g$, $h$, $j$, $k$, and $a$, are all pivot-joints, and may be varied from the construction shown by any other suitable joints. The link $m$ works in a slot in the frame of the sled, as shown.

The red outline shows the position of the parts when the locking-irons are raised and inoperative. The drawing otherwise shows these points depressed, in the act of braking or locking the sled. The angle of the irons B, in the latter case, impinges upon the snow, and causes the motion of the sled to be retarded, or stopped completely, if desired. The roller, working within the frame $n$, enables the locking-irons to be raised or depressed with facility, while the said frame $n$ permits the changed position of the roller in the two positions of the points, as shown. The locking-irons consist of one continuous bar, bent double, as shown, and each of the parts B again bent to form the angle $r$, thus providing a firm and effective locking-iron for the purpose described.

I am aware that sled-locks or brakes have been made, and I do not claim broadly such locks or brakes; but

What I claim as new, and desire to secure by Letters Patent, is—

1. The double-locking irons B B, bent or otherwise forming one continuous bar, all substantially as shown and described, in combination with a sled or sleigh, for the purpose of retarding the progress of the latter, all as set forth.

2. The lifting-bar $e$, substantially as shown and described, in combination with the locking-irons B B and lever $b$, all as and for the purpose set forth.

3. The frame $n$, substantially as shown and described, in combination with the roller $i$, locking-irons B B, and lifting-bar $e$, or the equivalent thereof, all as and for the purpose set forth.

4. The roller $i$, substantially as shown and described, in combination with the locking-irons B B and frame $n$, all as and for the purpose set forth.

JOHN CASSIDY.

Witnesses:
MILES H. RICE,
LYDIA MEARS.